US012566156B2

(12) United States Patent
Oberdieck et al.

(10) Patent No.: US 12,566,156 B2
(45) Date of Patent: Mar. 3, 2026

(54) POWER SEMICONDUCTOR DEVICE AND METHOD FOR DETECTING AGING-RELATED DAMAGE TO A POWER SEMICONDUCTOR DEVICE

(71) Applicant: Robert Bosch GmbH, Stuttgart (DE)

(72) Inventors: Karl Oberdieck, Neckartenzlingen (DE); Manuel Riefer, Reutlingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 311 days.

(21) Appl. No.: 18/558,217

(22) PCT Filed: Jul. 1, 2022

(86) PCT No.: PCT/EP2022/068252
§ 371 (c)(1),
(2) Date: Oct. 31, 2023

(87) PCT Pub. No.: WO2023/006338
PCT Pub. Date: Feb. 2, 2023

(65) Prior Publication Data
US 2024/0219350 A1      Jul. 4, 2024

(30) Foreign Application Priority Data
Jul. 29, 2021    (DE) ..................... 10 2021 208 252.1

(51) Int. Cl.
*G01N 29/11*          (2006.01)
*G01H 1/00*          (2006.01)
(Continued)

(52) U.S. Cl.
CPC ......... *G01N 29/11* (2013.01); *G01N 29/4436* (2013.01); *G01H 1/00* (2013.01);
(Continued)

(58) Field of Classification Search
CPC .............. G01N 29/11; G01N 29/4436; G01N 2291/0258; G01N 2291/2697; G01N 29/48; G01H 1/00
(Continued)

(56) References Cited
U.S. PATENT DOCUMENTS 4,366,713  A      1/1983  Gilmore et al.
2017/0194221  A1      7/2017  Davis et al.
(Continued)

FOREIGN PATENT DOCUMENTS

DE      102008002832  A1      12/2009
DE      102019211104  A1      1/2021
(Continued)

OTHER PUBLICATIONS

International Search Report for PCT/EP2022/068252, Issued Sep. 28, 2022.

*Primary Examiner* — Peter J Macchiarolo
*Assistant Examiner* — John M Royston
(74) *Attorney, Agent, or Firm* — NORTON ROSE FULBRIGHT US LLP

(57) ABSTRACT

A power semiconductor device. The power semiconductor device includes a heat sink and three half-bridge modules, which are each arranged on the heat sink by way of a connecting region. The power semiconductor device includes at least one ultrasonic sensor and at least one MEMS sensor, wherein the at least one ultrasonic sensor and the at least one MEMS sensor are arranged on opposite sides of the heat sink.

8 Claims, 2 Drawing Sheets

(51) Int. Cl.
  *G01N 29/44*    (2006.01)
  *G01N 29/48*    (2006.01)
(52) U.S. Cl.
  CPC ..... *G01N 29/48* (2013.01); *G01N 2291/0258*
      (2013.01); *G01N 2291/2697* (2013.01)
(58) Field of Classification Search
  USPC ......................................................... 73/600
  See application file for complete search history.

(56)                References Cited

U.S. PATENT DOCUMENTS

2018/0101944 A1*  4/2018  Sakai ...................... H01L 22/12
2020/0182930 A1   6/2020  Lal et al.
2021/0396714 A1   12/2021 Khan et al.
2022/0034958 A1*  2/2022  Denk ................. G01R 31/2834

FOREIGN PATENT DOCUMENTS

JP      2010267864  A    11/2010
JP      2017022310  A    1/2017
JP      2019144131  A    8/2019
JP      2020522713  A    7/2020
JP      2020177011  A    10/2020
WO      2010128432  A2   11/2010
WO      2021085234  A1   5/2021

* cited by examiner

200 start transmit ultrasonic signals ——210 receive or detect deflected or
reflected transmitted ultrasonic
signals ——220 evaluate received ultrasonic
signals ——230 end

POWER SEMICONDUCTOR DEVICE AND METHOD FOR DETECTING AGING-RELATED DAMAGE TO A POWER SEMICONDUCTOR DEVICE

FIELD

The present invention relates to a power semiconductor device and to a method for detecting aging-related damage to a power semiconductor device.

BACKGROUND INFORMATION

Power semiconductor devices within a chip are subject to aging processes. For example, these processes manifest themselves in cracks or a loss of contact in the structure and connections.

To make it possible to determine these aging processes, it is conventional to ascertain various auxiliary thermal or electrical variables, such as insulating layer temperature or conduction losses. This has the drawback that ascertaining these indirect parameters is complex and can involve errors in itself, meaning that the measurements are inaccurate.

An object of the present invention is to overcome these drawbacks.

SUMMARY

According to the present invention, a power semiconductor device comprises a heat sink and three half-bridge modules, which are each arranged on the heat sink by way of a connecting region. According to an example embodiment of the present invention, the power semiconductor device comprises at least one ultrasonic sensor and at least one MEMS sensor, wherein the at least one ultrasonic sensor and the at least one MEMS sensor are arranged on opposite sides of the heat sink.

This has the advantage that the degeneration of the structure and connections due to loss of contact can be measured directly.

In one development of the present invention, one ultrasonic sensor is arranged on each half-bridge module.

In a further embodiment of the present invention, one MEMS sensor is arranged on each half-bridge module.

It is advantageous here that any transmission paths within the power semiconductor device can be monitored by a plurality of actuators and sensors being positioned in a distributed manner, and the aging-related damage can be located precisely.

In one example embodiment of the present invention, the connecting region comprises a conductive paste.

In one development of the present invention, the heat sink comprises copper.

A method according to an example embodiment of the present invention for detecting aging-related damage to a power semiconductor device comprising a heat sink and three half-bridge modules, which are arranged on the heat sink by way of connecting regions, wherein the power semiconductor device comprises at least one ultrasonic sensor and at least one MEMS sensor, wherein the at least one ultrasonic sensor and the at least one MEMS sensor are arranged on opposite sides of the heat sink, comprises the steps of transmitting ultrasonic signals by way of the at least one ultrasonic sensor and receiving ultrasonic signals by way of the at least one MEMS sensor.

According to an example embodiment of the present invention, the method comprises evaluating the ultrasonic signals received by the MEMS sensor by way of an evaluation unit, wherein the evaluation unit comprises a memory in which at least one reference value is stored, wherein a difference between the received ultrasonic signals and the reference value is determined, and aging-related damage is ascertained if the difference exceeds a particular threshold value.

This has the advantage that aging-related damage within the power semiconductor device can be determined with low manufacturing costs.

In one development of the present inventiom, the power semiconductor device comprises three ultrasonic sensors, wherein, for detecting the aging-related damage, ultrasonic signals are transmitted at different points in time, wherein ultrasonic signals from a single ultrasonic sensor of the three ultrasonic sensors are transmitted at a particular point in time. In other words, the three ultrasonic sensors transmit their ultrasonic signals at different points in time, for example alternately.

It is advantageous here that the aging-related damage can be monitored across the power semiconductor device as a whole.

In a further embodiment of the present invention, ultrasonic signals having the same levels are transmitted.

It is advantageous here that the signal processing is simple.

Further advantages will become clear from the following description of exemplary embodiments of the present invention and from the rest of the disclosure herein.

BRIEF DESCRIPTION OF THE DRAWINGS

The present invention is explained in the following with reference to preferred specific embodiments and the figures.

DETAILED DESCRIPTION OF EXAMPLE EMBODIMENTS

Figure 1:
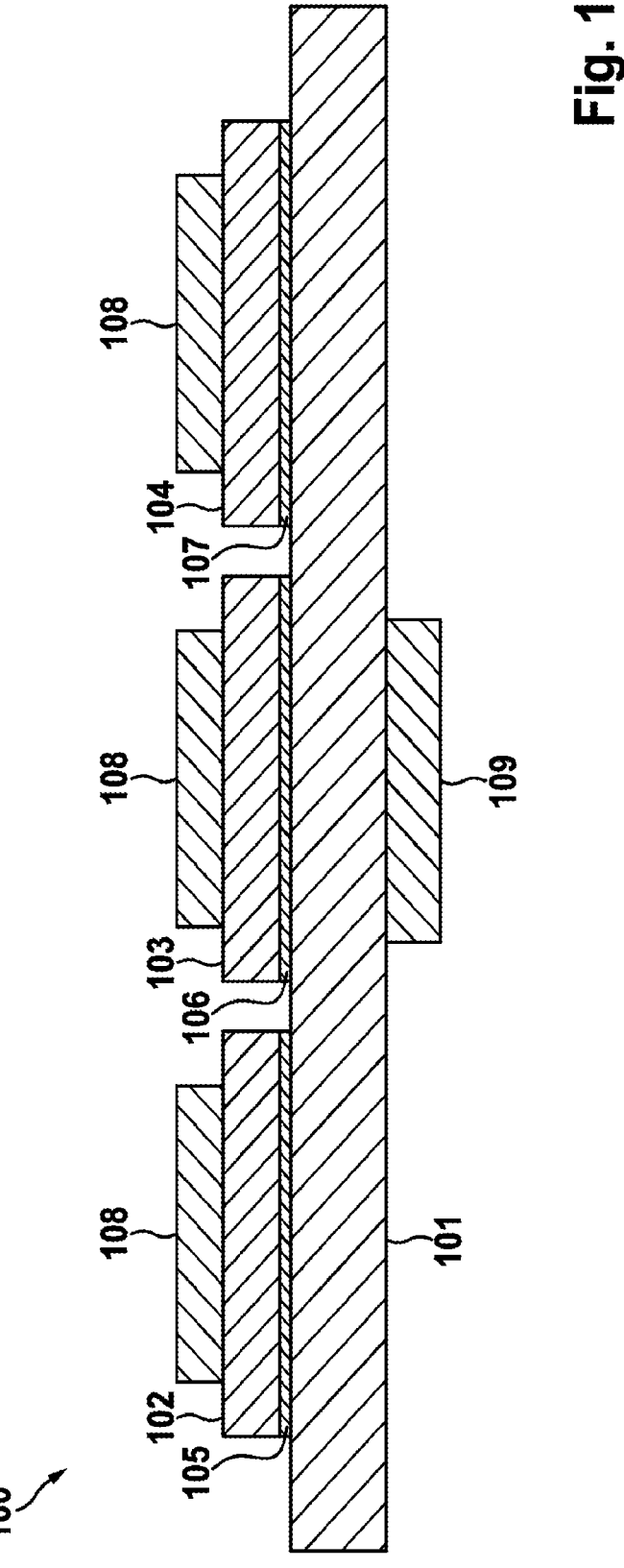
FIG. 1 shows a power semiconductor device, according to an example embodiment of the present invention.

FIG. 1 shows a power semiconductor device 100 comprising a heat sink 101 and three half-bridge modules 102, 103 and 104. The three half-bridge modules 102, 103 and 104 are arranged on the heat sink 101 by way of connecting regions 105, 106 and 107. The power semiconductor device 100 comprises at least one ultrasonic sensor 108, which functions as a transmitting unit, and at least one MEMS sensor 109, which functions as a receiving unit. The at least one ultrasonic sensor 108 and the at least one MEMS sensor 109 are arranged on opposite sides of the heat sink 101. The heat sink 101 comprises copper, for example. The connecting regions 105, 106 and 107 comprise a conductive paste, a bonded connection, or a soldered connection, for example. The power semiconductor device 100 is a power module or a B6 bridge, for example.

In one exemplary embodiment of the present invention, one ultrasonic sensor 108 is arranged on each half-bridge module 102, 103 and 104. A MEMS sensor 109 is arranged on the opposite side of the heat sink 101 and is part of a gate driver. In other words, a plurality of transmitting units and one receiving unit are arranged within the power semiconductor device 100.

In a further exemplary embodiment, one MEMS sensor 109 is arranged on each half-bridge module 102, 103 and

104. An ultrasonic sensor 108 is arranged on the opposite side of the heat sink 101. In other words, a plurality of receiving units and one transmitting unit are arranged within the power semiconductor device 100.

Figure 2:
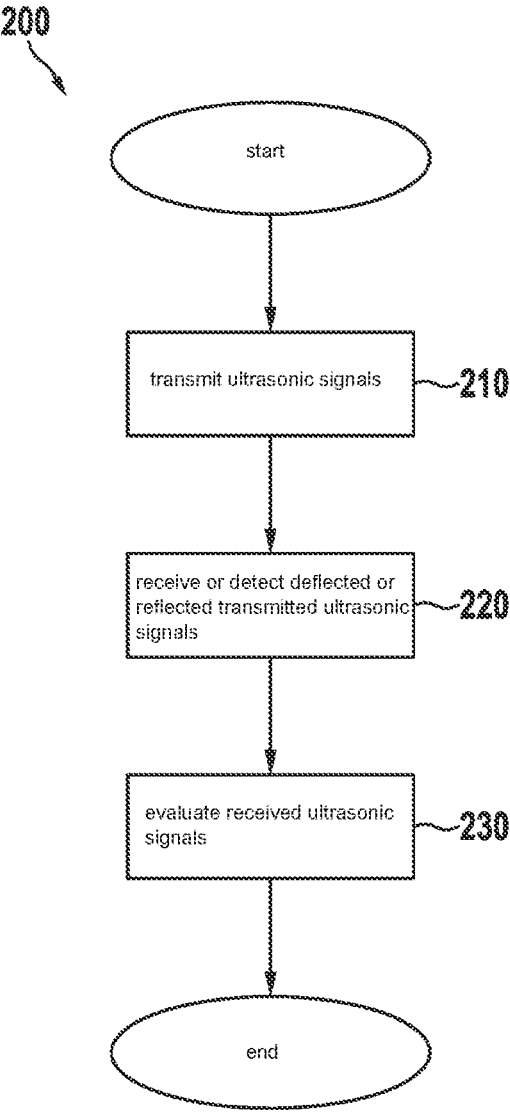
FIG. 2 shows a method for detecting aging-related damage to a power semiconductor device, according to an example embodiment of the present invention.

FIG. 2 shows the method 200 according to the present invention for detecting aging-related damage to a power semiconductor device as shown in FIG. 1. The method 200 starts with a step 210, in which ultrasonic signals are transmitted by way of at least one ultrasonic sensor. In a subsequent step 220, the transmitted ultrasonic signals which are deflected or reflected by the inner structures of the power semiconductor device are received or detected by at least one MEMS sensor. In this case, the deflected or reflected ultrasonic signals have a modified frequency response. In a subsequent step 230, the ultrasonic signals received by the MEMS sensor are evaluated by way of an evaluation unit. The evaluation unit comprises a memory, in which at least one reference value is stored. For this purpose, the reference value is for example determined from measured values upon completion of the method for manufacturing the power semiconductor device or from calibration data and has a known characteristic frequency image of an intact power semiconductor device. In the evaluation, a difference between the received ultrasonic signals and the reference value is determined in the frequency range. Alternatively, the difference can be determined using the amplitudes of the received ultrasonic signals and the reference value. If this difference exceeds a particular threshold value, there is aging-related damage, and if not, this is a tolerable deviation.

In one exemplary embodiment, the power semiconductor device comprises three ultrasonic sensors. In this case, the three ultrasonic sensors transmit at different points in time, with a time lag between them. In this way, the state of the boundary surface between the various individual components of the power semiconductor device can be ascertained and the aging-related damage can be located precisely.

In a further exemplary embodiment, ultrasonic signals having the same levels are transmitted by the three ultrasonic sensors.

The power semiconductor device is used in power modules for drive inverters or in discrete components, for example.

What is claimed is:

1. A power semiconductor device, comprising:
a heat sink;
three half-bridge modules which are each arranged on the heat sink by way of a connecting region;
at least one ultrasonic sensor; and at least one MEMS sensor, wherein the at least one ultrasonic sensor and the at least one MEMS sensor are arranged on opposite sides of the heat sink, relative to one another.

2. The power semiconductor device as recited in claim 1, wherein one ultrasonic sensor is arranged on each of the half-bridge modules.

3. The power semiconductor device as recited in claim 1, wherein one MEMS sensor is arranged on each of the half-bridge modules.

4. The power semiconductor device as recited in claim 1, wherein the connecting region includes a conductive paste.

5. The power semiconductor device as recited in claim 1, wherein the heat sink includes copper.

6. A method for detecting aging-related damage to a power semiconductor device, the power semiconductor device including a heat sink and three half-bridge modules, which are arranged on the heat sink by way of connecting regions, wherein the power semiconductor device includes at least one ultrasonic sensor and at least one MEMS sensor, wherein the at least one ultrasonic sensor and the at least one MEMS sensor are arranged on opposite sides of the heat sink, relative to one another, the method comprising the following steps:

transmitting ultrasonic signals using the at least one ultrasonic sensor;

receiving ultrasonic signals using the at least one MEMS sensor; and evaluating the ultrasonic signals received by the MEMS sensor using an evaluation unit, wherein the evaluation unit includes a memory in which at least one reference value is stored, wherein a difference between the received ultrasonic signals and the reference value is ascertained, wherein the aging-related damage is detected based on the difference exceeding a particular threshold value.

7. The method as recited in claim 6, wherein the power semiconductor device includes three ultrasonic sensors, wherein, for detecting the aging-related damage, the ultrasonic signals are transmitted at different points in time, wherein ultrasonic signals from a single ultrasonic sensor of the three ultrasonic sensors are transmitted at a particular point in time.

8. The method as recited in claim 7, wherein ultrasonic signals having the same levels are transmitted.

* * * * *